(12) United States Patent
Simonetti et al.

(10) Patent No.: US 11,268,390 B2
(45) Date of Patent: Mar. 8, 2022

(54) VORTEX GENERATORS FOR TURBINE ENGINE EXHAUST

(71) Applicant: Sikorsky Aircraft Corporation, Stratford, CT (US)

(72) Inventors: Joseph Lawrence Simonetti, Southbury, CT (US); Donald W. Lamb, Jr., North Haven, CT (US); Patrick Ormande Bowles, Glastonbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 167 days.

(21) Appl. No.: 16/039,865

(22) Filed: Jul. 19, 2018

(65) Prior Publication Data

US 2020/0024983 A1   Jan. 23, 2020

(51) Int. Cl.
*F02K 1/46* (2006.01)
*F01D 9/02* (2006.01)

(52) U.S. Cl.
CPC .................. *F01D 9/02* (2013.01); *F02K 1/46* (2013.01); *F05D 2240/127* (2013.01); *F05D 2250/11* (2013.01)

(58) Field of Classification Search
CPC .......... F01D 25/30; F01D 25/305; F01D 9/02; F02K 1/36; F02K 1/386; F02K 1/46; F02K 1/48; F02K 1/52; F02K 1/78; F02K 1/80; F02K 1/82; F02K 1/825
See application file for complete search history.

(56) References Cited

U.S. PATENT DOCUMENTS

| | | | |
|---|---|---|---|
| 4,298,089 A * | 11/1981 | Birch | F02K 1/386 181/213 |
| 6,412,283 B1 | 7/2002 | Sheoran et al. | |
| 7,380,639 B2 | 6/2008 | Arlasky | |
| 2003/0183723 A1* | 10/2003 | Bevilaqua | B64C 29/0066 244/12.5 |
| 2009/0320486 A1* | 12/2009 | Gutmark | F02K 1/48 60/770 |
| 2012/0279225 A1* | 11/2012 | Colas | F02K 1/46 60/770 |
| 2016/0258358 A1* | 9/2016 | Kazlauskas | B64D 33/08 |
| 2017/0335728 A1 | 11/2017 | Shin et al. | |

FOREIGN PATENT DOCUMENTS

WO   WO-2016140866 A1 *   9/2016   ............. F01D 25/30
WO   2017222124 A1   12/2017

* cited by examiner

*Primary Examiner* — Scott J Walthour
(74) *Attorney, Agent, or Firm* — Foley & Lardner LLP (57) ABSTRACT

An exhaust system for an engine includes an exhaust nozzle located adjacent an outlet end of the engine to receive a primary flow of exhaust gasses expelled from the engine, an inlet opening formed between the exhaust nozzle and the outlet end of the engine through which a secondary flow is provided to the exhaust nozzle, and a vortex generator arranged within the exhaust system at a position where both the primary flow and the secondary flow are present. The vortex generator interrupts at least one of the primary flow and the secondary flow.

16 Claims, 6 Drawing Sheets

VORTEX GENERATORS FOR TURBINE ENGINE EXHAUST

BACKGROUND

Embodiments of the disclosure relate to a turbine engine, and more particularly, to an exhaust duct for use with a turboshaft turbine engine of a rotary wing aircraft.

Rotary-wing aircraft commonly use one or more turboshaft engines to drive rotation of the primary rotary device, in addition to supplying the vehicle's subsystems with power. The exhaust of the turboshaft engine is not utilized for momentum thrust in rotary-wing applications.

Engine performance is maximized when the exhaust duct design returns the high pressure, high temperature gas turbine exhaust air to relatively cool, ambient conditions without causing further increases to the pressure of the turbine outlet, referred to herein as "backpressure." High backpressure downstream of the turboshaft engine outlet at an operating point directly reduces engine system efficiency. Separation and inadequate diffusion of the turboshaft engine exhaust air caused by the exhaust duct design are primary causes of turboshaft turbine outlet high backpressure. However, because the return of the exhaust flow to ambient conditions would require impractical exhaust duct designs, existing exhaust duct designs are insufficient and negatively impact the performance of the engine. For example, existing exhaust duct designs include large turning angles and other high-loss design features.

Further, turboshaft engines may include an ejector arrangement to provide cooling airflow to the engine compartment. An annular gap formed between an exhaust duct and the rear of the engine exists which allows air from the compartment to flow through and out the exhaust duct, mixing with the primary turboshaft engine exhaust flow. In such systems, the high speed flow provided by the engine exhaust is the primary flow, and the air passing through the compartment and the ejector gap is the secondary airflow. In such arrangements, the exhaust duct acts as the ejector mixing duct, with the combined engine exhaust and compartment cooling ultimately exiting the exhaust duct.

The efficiency of such ejector systems may depend on the geometry of the ejector gap and downstream exhaust duct attributes, especially if the exhaust duct includes high loss features or a large turning angle where airflow separation may occur. In some instances, limited secondary cooling airflow, or exhaust back flow, in which hot engine exhaust flows back into the compartment, may result in degraded engine performance, loss of engine system components, and emergency operations.

Accordingly, it is desirable to provide an enhanced exhaust duct design, which will increase the performance of the engine and/or ejector system.

BRIEF DESCRIPTION

According to an embodiment, an exhaust system for an engine includes an exhaust nozzle located adjacent an outlet end of the engine to receive a primary flow of exhaust gasses expelled from the engine, an inlet opening formed between the exhaust nozzle and the outlet end of the engine through which a secondary flow is provided to the exhaust nozzle, and a vortex generator arranged within the exhaust system at a position where both the primary flow and the secondary flow are present. The vortex generator interrupts at least one of the primary flow and the secondary flow.

In addition to one or more of the features described above, or as an alternative, in further embodiments the vortex generator is mounted to an interior surface of the exhaust nozzle.

In addition to one or more of the features described above, or as an alternative, in further embodiments the vortex generator is mounted to an interior surface of an inboard side of the exhaust nozzle.

In addition to one or more of the features described above, or as an alternative, in further embodiments comprising a center body extending at least partially into the exhaust nozzle.

In addition to one or more of the features described above, or as an alternative, in further embodiments the vortex generator is mounted to the center body.

In addition to one or more of the features described above, or as an alternative, in further embodiments the secondary flow is external air drawn from at least one of outside the aircraft and an engine bay of the aircraft.

In addition to one or more of the features described above, or as an alternative, in further embodiments the exhaust nozzle further comprises a central axis and the vortex generator is arranged at an angle to the central axis.

In addition to one or more of the features described above, or as an alternative, in further embodiments the angle is greater than zero.

In addition to one or more of the features described above, or as an alternative, in further embodiments the exhaust duct has a generally linear contour.

In addition to one or more of the features described above, or as an alternative, in further embodiments the exhaust duct includes a first end and a second opposite end, the first end being arranged within a first plane, and the second end being arranged within a second plane, the second plane being oriented at an angle to the first plane.

In addition to one or more of the features described above, or as an alternative, in further embodiments the angle between the first plane and the second plane is between 70° and 110°.

In addition to one or more of the features described above, or as an alternative, in further embodiments the vortex generator further comprises a plurality of vortex generators.

In addition to one or more of the features described above, or as an alternative, in further embodiments each of the plurality of the vortex generators is substantially identical in shape.

In addition to one or more of the features described above, or as an alternative, in further embodiments the plurality of vortex generators vary in shape.

In addition to one or more of the features described above, or as an alternative, in further embodiments a first vortex generator of the plurality of vortex generators has a first orientation and a second vortex generator of the plurality of vortex generators has a second orientation, different from the first orientation.

According to another embodiment, a method of cooling engine exhaust gasses includes expelling the engine exhaust gasses from an engine outlet to an exhaust duct, drawing a secondary flow through an inlet opening formed between the engine outlet and the exhaust duct, and interrupting at least one of the engine exhaust gasses and the secondary flow within the exhaust duct via a vortex generator arranged within the exhaust duct.

In addition to one or more of the features described above, or as an alternative, in further embodiments interrupting at least one of the engine exhaust gasses and the secondary flow within the exhaust duct includes creating vortices within one of the engine exhaust gasses and the secondary flow.

In addition to one or more of the features described above, or as an alternative, in further embodiments interrupting at least one of the engine exhaust gasses and the secondary flow mixes the exhaust gasses and the secondary flow.

In addition to one or more of the features described above, or as an alternative, in further embodiments comprising reducing a speed of the exhaust gasses within the exhaust duct.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
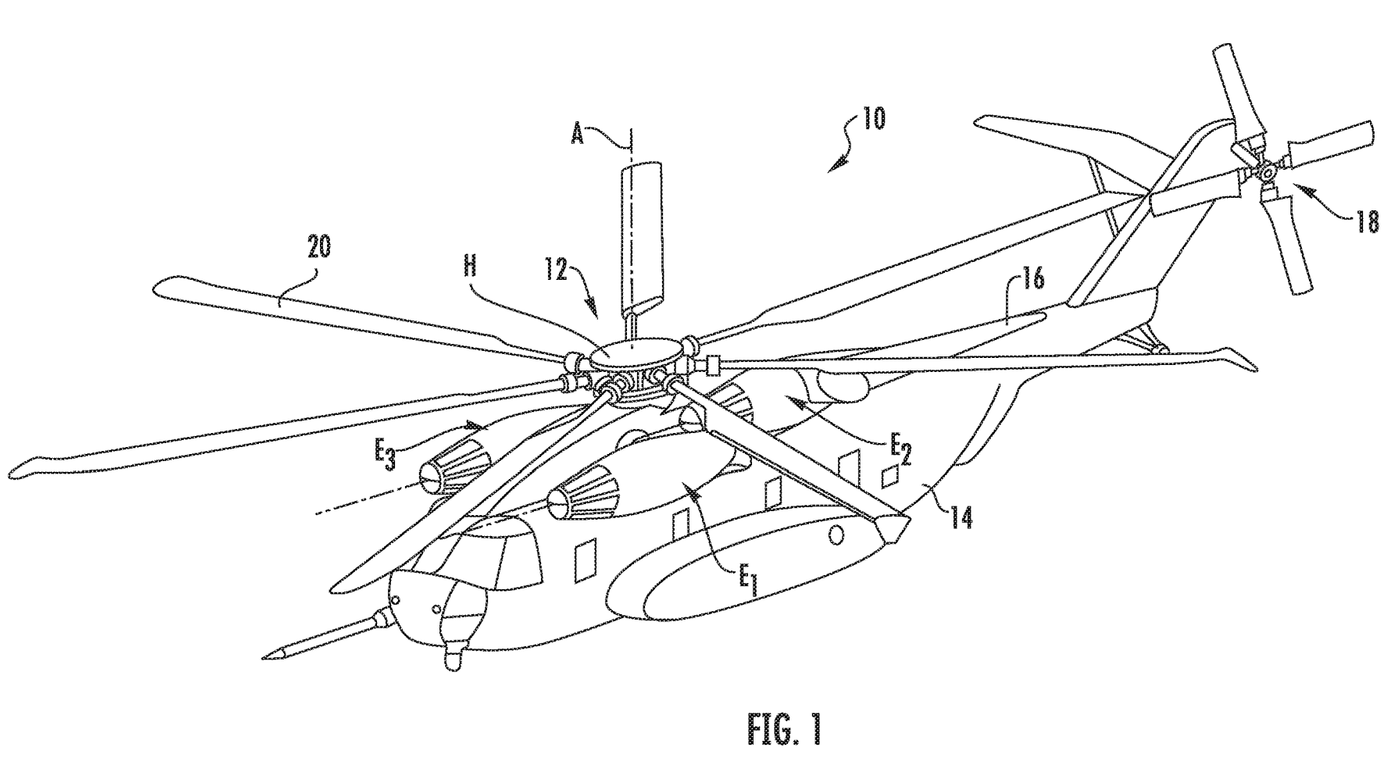
FIG. 1 is a perspective view of a rotary wing aircraft.

FIG. 1 schematically illustrates a rotary wing aircraft 10 having a main rotor assembly 12. The aircraft 10 includes an airframe 14 having an extended tail 16 which mounts a tail rotor system 18, such as an anti-torque system, a translational thrust system, a pusher propeller, a rotor propulsion system, and the like. The main rotor assembly 12 includes a plurality of rotor blade assemblies 20 mounted to a rotor hub H. The main rotor assembly 12 is driven about an axis of rotation A through a main gearbox (not shown) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the disclosure Referring now to FIG. 2, an example of a cross-section of an engine E of a rotary wing aircraft, such as aircraft 10 for example, is illustrated in more detail. The illustrated engine E is a gas turbine engine including in serial flow communication a multistage compressor 30 for pressurizing the air, a combustor 32 in which the compressed air is mixed with fuel and ignited for generating an annular stream of hot combustion gasses, and a turbine section 34 for extracting energy from the combustion gases and converting the energy to mechanical shaft horsepower. The turbine engine E terminates in an exhaust section 36.

Figure 2:
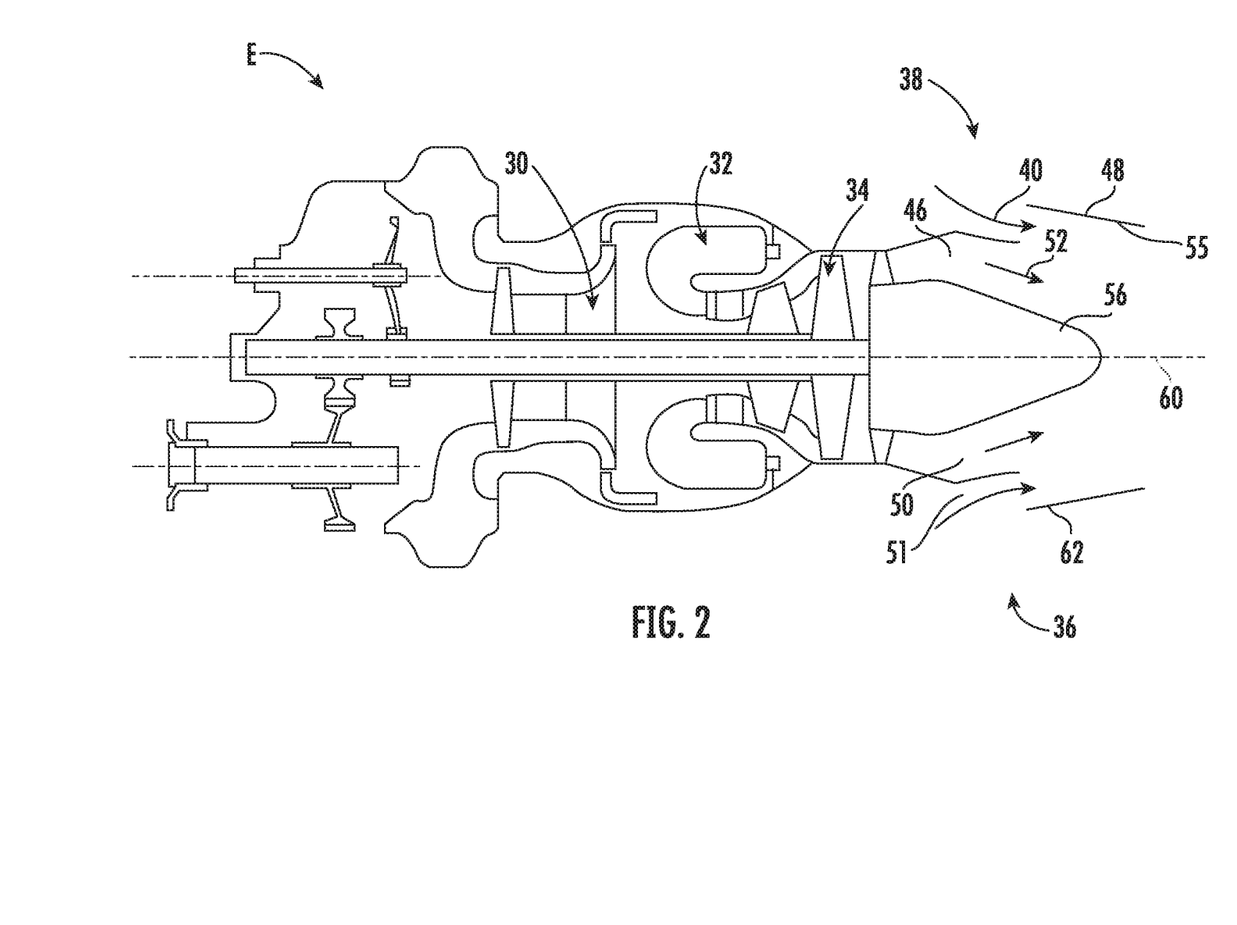
FIG. 2 is a schematic view of a cross-section of an engine of a rotary wing aircraft.
Figure 3:
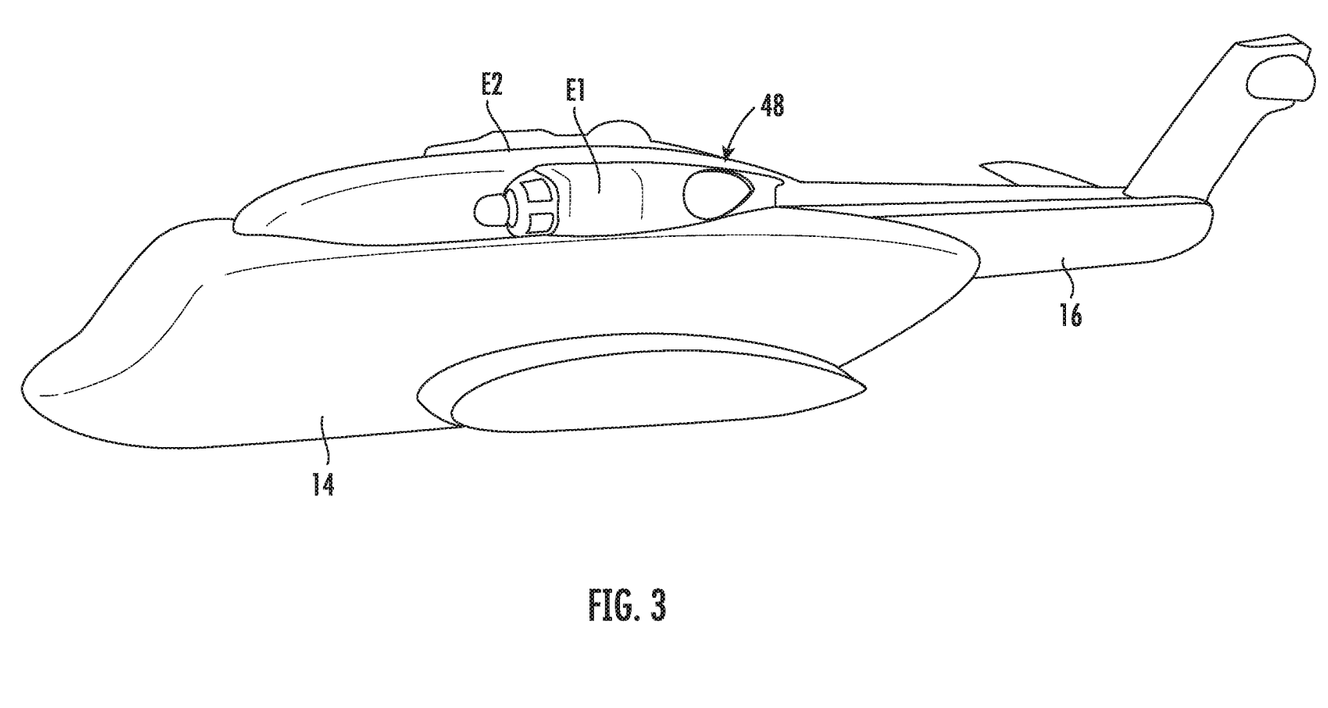
FIG. 3 is a perspective view of a rotary wing aircraft including an exhaust duct according to an embodiment.
Figure 4:
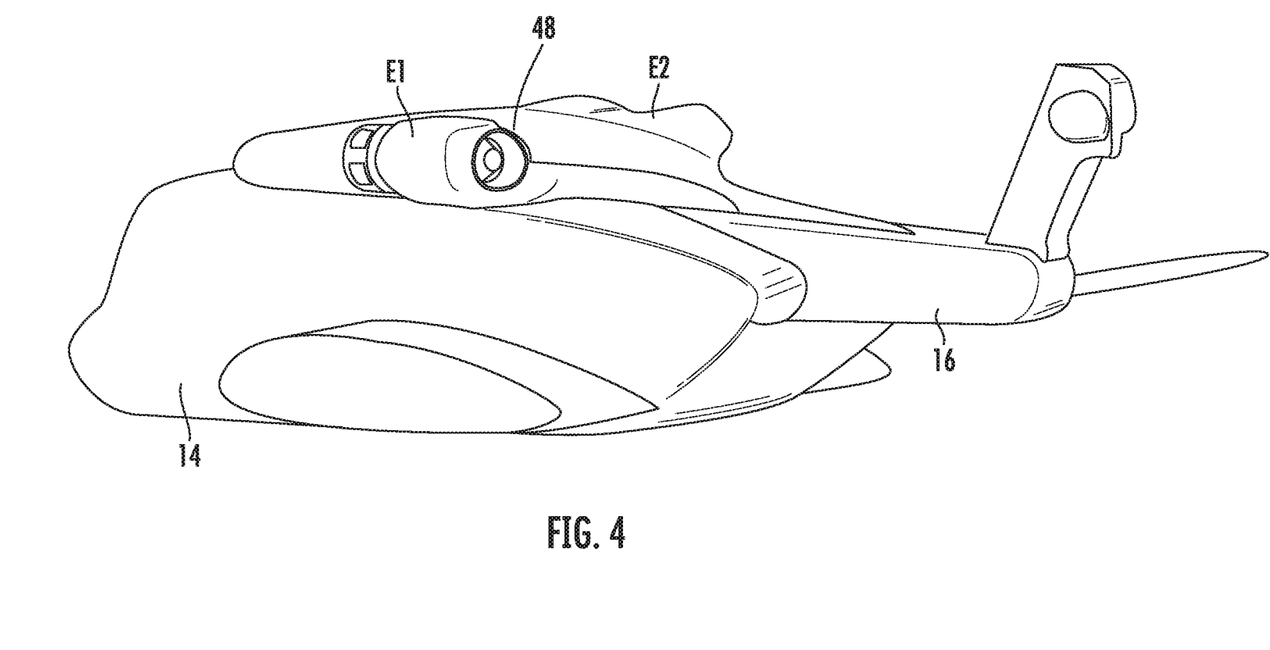
FIG. 4 is a rear perspective view of a rotary wing aircraft including an exhaust duct according to an embodiment.
Figure 5:
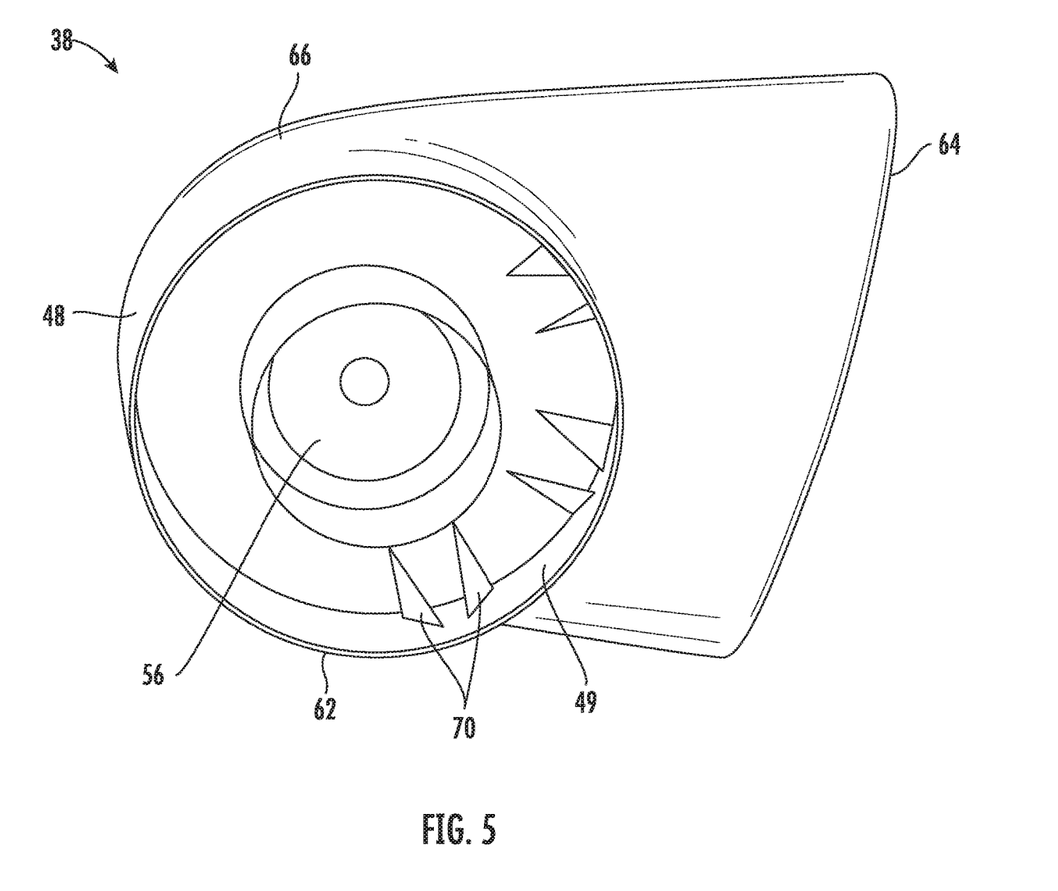
FIG. 5 is a forward view looking aft of an exhaust duct according to an embodiment.
Figure 6:
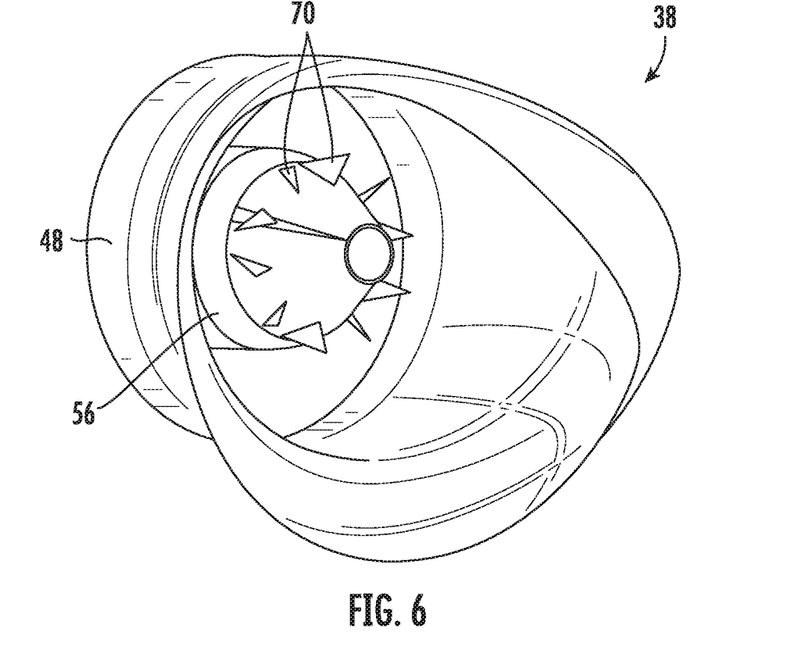
FIG. 6 is a perspective view of another exhaust duct according to an embodiment.
Figure 7:
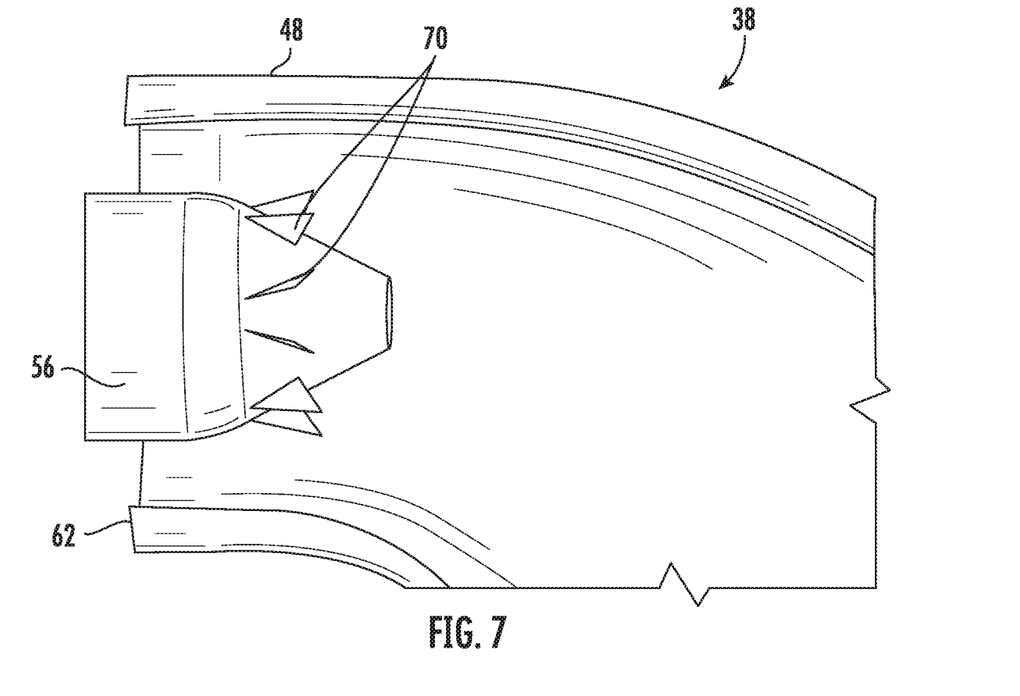
FIG. 7 is a cross-sectional view of the exhaust duct of FIG. 6 according to an embodiment.

As shown, the exhaust section 36 includes an exhaust ejector system 38 which is used to draw an air flow 40 for ventilation or cooling through an inlet 42. The air flow 40 may be external air, or alternatively, may be air from any suitable source such as an engine compartment or a generally cooler flow region. In the illustrated, non-limiting embodiment, the ejector system 38 includes a primary nozzle 46 and an adjacent exhaust duct or shroud 48. The primary nozzle 46 has a generally tubular wall 50 configured to guide a flow of exhaust gasses exiting from the turbine section 34. The exhaust gasses travelling through and subsequently exiting the nozzle 46, referred to herein as primary flow 52, move in a direction generally indicated by the arrow. At the same time, a secondary flow 40, such as external air drawn from outside the aircraft for example, travels through the opening 42 formed between the primary nozzle 46 and the exhaust duct 48 such that the secondary flow 40 and the primary flow 52 mix within the exhaust duct 48. In an embodiment, the exhaust duct 48 acts as a diffuser to slow down a speed of the hot exhaust gasses output from the turbine engine E.

In some embodiments, the exhaust section 36 includes a center body 56 arranged within the nozzle 46 and extending into the exhaust duct 48, as shown in FIG. 2. In such embodiments, the primary flow 52 is generally annular about the center body 56. However, the configuration of the flow path of the primary flow 52 through the nozzle 46 is also affected by the shape of an inner surface of the tubular wall 50 of the nozzle 46. A central axis 60 can be defined relative to the tubular wall 50. Accordingly, the tubular wall 50 can be said to have a radially inner-surface exposed to the primary flow, and a radially-outer surface which may be at least partially exposed to a radially-outer surrounding medium, such as external air flow 40 for example. Although the ejector system 38 is illustrated and described herein as including both a primary nozzle 46 and an exhaust duct 48, in other embodiments, the ejector system 38 does not include a primary nozzle 46, and the exhaust duct 48 is mounted generally concentrically with the turbine section 34 of the engine E.

Referring now to FIGS. 3-7, the exhaust duct 48 of the gas turbine engine E is illustrated in more detail. As shown, a first end 62 of the exhaust duct 48 located adjacent the primary nozzle 46 or outlet end of the engine E is arranged within a first plane and a second, opposite end 64 of the exhaust duct 48 is arranged within a second plane. In an embodiment, such as shown in FIGS. 3 and 5-7, the second plane is arranged at an angle to the first plane such that the exhaust duct 48 includes a bend region 66. A turning angle formed between the first end 62 and the second end 64 may be between 70° and 110° for example, and in some embodiments, the second end 64 is oriented generally perpendicular to the first end 62. However, it should be understood that embodiments where the exhaust duct 48 has a generally linear contour, i.e. the first end 62 and second end 64 are substantially parallel to one another are also within the scope of the disclosure.

Further, the exhaust duct 48 may be generally axially symmetric over its length, or alternatively, may have an asymmetric profile. In such instances, a radius of the duct 48 extending from the central axis 60 thereof in a first direction is greater than a radius of the duct 48 extending in a second, substantially opposite direction over at least a portion of the length of the duct 48. However, an exhaust duct 48 having another profile is also within the scope of the disclosure.

The exhaust section 36 includes one or more vortex generators 70, also referred to herein as "vortex generators". The vortex generators 70 may be formed from any suitable material. In aerospace applications, suitable materials include high temperature, corrosion resistant alloys, such as Inconel 625 for example.

The vortex generators 70 are generally located at a position forward of high-loss exhaust duct 48 features, for example, the turning angle formed from first end 62 to second end 64. In an embodiment, best shown in FIG. 5, the vortex generators 70 are mounted to the interior surface 49 of the exhaust duct 48, such as the adjacent inboard side thereof, for example. In such embodiments, the vortex generators 70 extend radially inwardly, generally toward the center body 56. For an exhaust duct 48 including an ejector gap assembly, one or more variations in the shape of the vortex generators 70 may occur as they protrude from the surface they are mounted. In another embodiment, shown in FIGS. 6-7, the vortex generators 70 are mounted about the exterior surface of the center body 56. In such embodiments, the vortex generators 70 extend generally radially outwardly, toward the exhaust duct walls 48. It should be understood that embodiments illustrating vortex generators 70 mounted to the exhaust duct 48 or the center body 56 are intended as an example only and that embodiments including vortex generators 70 mounted to both the exhaust duct 48 and the center body 56, as well as any to other location of the ejector system 38 are within the scope of the disclosure. The arrangement of vortex generators 70 should not be considered limited to the examples shown herein.

Although the vortex generators 70 illustrated in the FIGS. are generally triangular in shape, vortex generators 70 having another shape, such as rectangular, square, or airfoil shape for example, is also contemplated herein. Further, in embodiments including a plurality of vortex generators 70, the shape of each of the plurality of vortex generators 70 may be substantially identical, or alternatively, may vary. In addition, each of the vortex generators 70 may be mounted to a respective surface of the ejector system 38 with a desired orientation. The orientation of each of the vortex generators 70 mounted to a given surface of the ejector system 38 may be substantially identical, or alternatively, may vary. For example, a base of each of the plurality of vortex generators 70 is generally arranged at an angle to a central axis 60 of the ejector system 38 to increase the amount of flow that interacts with the vortex generators 70. In an embodiment, the vortex generators 70 may be arranged in groups about a surface, such as the internal surface 49 of the exhaust duct 48 for example, and adjacent vortex generators 70 within the group may have a different orientation or angle relative to the axis 60. For example, in an embodiment, the angle of the vortex generators 70 relative to the axis 60 is between 0° and 45°, and more specifically between 5° and 30°.

The function of the vortex generators 70 is to improve the turboshaft engine exhaust attributes. Corollary benefits of inclusion of one or more of the vortex generators 70 include improving the diffusion process between the primary flow 52 and secondary flow 40, which reduces the exhaust losses. The vortex generators 70 create vortices that induce additional mixing that would not otherwise occur without such vortex generators 70, prior to being expelled from the exhaust duct 48. The distal end of each vortex generator 70 extends into or through one or both of the primary flow 52 and the secondary flow 40 to develop fluid structures that more effectively mix the two fluid streams.

Varying one or more parameters of the vortex generators 70, i.e. shape, cross-section, orientation, symmetry, may further optimize the mixing performance achieved by the vortex generators 70. Application of one or more vortex generators 70 along the exhaust duct 48 may reduce back pressure through elimination of adverse flow characteristics that form in the absence of vortex generators 70. Inclusion of one or more vortex generators 70 within the interior of the exhaust section 36 and/or ejector system 38 may improve ejector performance through reduction of adverse airflow distributions and/or ejector and primary exhaust flow interactions. Further, by positioning one or more vortex generators 70 at the center body 56, the vortex generators 70 capitalize on the disproportionately higher mass flow at the inner diameter of the flow annulus, while reducing or eliminating the wake downstream of the center body 56.

It should be understood that the embodiments of the vortex generators 70 illustrated and described herein are intended as an example only. Other configurations including variations in one or more of vortex generator planform, alignment of vortex generator pairs, additional rows of vortex generators mounted along the ejector system 38, as well as vortex generators that are actively controlled through mechanization, pneumatic, or other methodology and deployed or scheduled based on turboshaft turbine operations are also within the scope of the disclosure.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of cooling engine exhaust gasses of an engine having an exhaust system, comprising:
   expelling the engine exhaust gasses from an engine outlet, through an exhaust nozzle, and to an exhaust duct, the exhaust duct positioned radially outward from the exhaust nozzle and disposed to receive a primary flow of the engine exhaust gasses, the exhaust duct comprising an outlet;
   drawing a secondary flow into the exhaust duct through an inlet defined by an opening between the exhaust nozzle and the exhaust duct; and
   interrupting at least one of the primary flow of the engine exhaust gasses or the secondary flow within the exhaust duct via a plurality of vortex generators, the plurality of vortex generators being arranged in pairs within the exhaust system, each pair including a first vortex generator and a second vortex generator adjacent to the first vortex generator, wherein the pairs spaced from each other such that a circumferential distance between each adjacent pair is greater than a distance between the first vortex generator and the second vortex generator within each pair, wherein the plurality of vortex generators are disposed at positions where both the primary flow and the secondary flow are present during operation of the engine, and the plurality of vortex generators being further configured such that:
(i) each pair is disposed along a common surface within the exhaust system, the common surface being an interior surface of the exhaust duct, each pair being located closer to the inlet than to the outlet of the exhaust duct;
(ii) a base of the first vortex generator and a base of the second vortex generator are respectively arranged at a first angle and a second angle relative to a central axis of the exhaust system; and
(iii) the first vortex generator is angled toward the second vortex generator to increase at least one of an amount of primary flow or secondary flow interacting with the first and second vortex generators;
wherein each vortex generator of the plurality of vortex generators is triangular in shape, having a first vertex, a second vertex, and a third vertex positioned away from the interior surface of the exhaust duct;
wherein the base of the vortex generator is defined between the first vertex and the second vertex, the first vertex and the second vertex being disposed to contact the interior surface of the exhaust duct; and
wherein among each pair of vortex generators, a distance between the second vertex of the first vortex generator and the second vertex of the second vortex generator is less than a distance between the first vertex of the first vortex generator and the first vertex of the second vortex generator.

2. The method of claim 1, wherein interrupting at least one of the primary flow or the secondary flow within the exhaust duct includes creating vortices within one of the primary flow or the secondary flow.

3. The method of claim 1, wherein interrupting at least one of the primary flow or the secondary flow mixes the primary flow and the secondary flow.

4. The method of claim 1, further comprising reducing a speed of the exhaust gasses within the exhaust duct.

5. A system comprising an engine having an exhaust system, the exhaust system comprising:
an exhaust nozzle positioned adjacent an outlet end of the engine to receive a primary flow of exhaust gasses expelled from the engine;
an exhaust duct positioned radially outward from the exhaust nozzle, the exhaust duct comprising an outlet;
an inlet defined by an opening between the exhaust nozzle and the exhaust duct through which a secondary flow is provided to the exhaust duct; and
a plurality of vortex generators arranged in pairs within the exhaust system, each pair including a first vortex generator and a second vortex generator adjacent to the first vortex generator, wherein the pairs are spaced from each other such that a circumferential distance between each adjacent pair is greater than a distance between the first and second vortex generators within each pair, wherein the plurality of vortex generators are disposed at positions where both the primary flow and the secondary flow are present during operation of the engine, the plurality of vortex generators configured to interrupt at least one of the primary flow or the secondary flow, and the plurality of vortex generators being further configured such that:
(i) each pair is disposed along a common surface within the exhaust system, the common surface being an interior surface of the exhaust duct, each pair being located closer to the inlet than to the outlet of the exhaust duct;
(ii) a base of the first vortex generator and a base of the second vortex generator are respectively arranged at a first angle and a second angle relative to a central axis of the exhaust system; and
(iii) the first vortex generator is angled toward the second vortex generator to increase at least one of an amount of primary flow or secondary flow interacting with the first and second vortex generators;
wherein each vortex generator of the plurality of vortex generators is triangular in shape, having a first vertex, a second vertex, and a third vertex positioned away from the interior surface of the exhaust duct;
wherein the base of the vortex generator is defined between the first vertex and the second vertex, the first vertex and the second vertex being disposed to contact the interior surface of the exhaust duct; and
wherein among each pair of vortex generators, a distance between the second vertex of the first vortex generator and the second vertex of the second vortex generator is less than a distance between the first vertex of the first vortex generator and the first vertex of the second vortex generator.

6. The system of claim 5, further comprising a center body extending at least partially into the exhaust nozzle.

7. The system of claim 5, wherein the engine is disposed within an aircraft and wherein the secondary flow is external air drawn from at least one of a region outside the aircraft or from an engine bay of the aircraft.

8. The system of claim 5, wherein the plurality of vortex generators are arranged at an angle to the central axis that is between 0° and 45°.

9. The system of claim 5, wherein the exhaust duct is linear.

10. The system of claim 5, wherein the exhaust duct includes a first end and a second end opposite the first end, the first end being arranged within a first plane, and the second end being arranged within a second plane, the exhaust duct comprising a bend region such that the second plane is oriented at an angle to the first plane.

11. The system of claim 10, wherein the first vortex generator is angled toward the second vortex generator such that when viewed in an aft direction of the exhaust duct, an edge of the first vortex generator that is a closest edge to the second vortex generator is the longest edge of the first vortex generator, and an edge of the second vortex generator that is a closest edge to the first vortex generator is the longest edge of the second vortex generator.

12. The system of claim 10, wherein the angle between the first plane and the second plane is between 70° and 110°.

13. The system of claim 5, wherein each of the plurality of the vortex generators is substantially identical in shape.

14. The system of claim 5, wherein the plurality of vortex generators vary in shape.

15. The system of claim 5, wherein the first vortex generator of the plurality of vortex generators has a first orientation and the second vortex generator of the plurality of vortex generators has a second orientation, different from the first orientation.

16. The system of claim 5, wherein each of the plurality of vortex generators is mounted within the exhaust system at an angle between 5° and 30° relative to a central axis of the exhaust system.

\* \* \* \* \*